(12) United States Patent
Xavier et al.

(10) Patent No.: US 9,218,264 B2
(45) Date of Patent: Dec. 22, 2015

(54) TECHNIQUES FOR TRANSLATING POLICIES INTO STORAGE CONTROLLER REQUIREMENTS

(71) Applicant: CloudByte, Inc., San Mateo, CA (US)

(72) Inventors: Felix Xavier, Bangalore (IN); Umasankar Mukkara, Bangalore (IN); Shyamsundar Ranganathan, Bangalore (IN)

(73) Assignee: CloudByte, Inc., Cupertino, CA (US)

( * ) Notice: Subject to any disclaimer, the term of this patent is extended or adjusted under 35 U.S.C. 154(b) by 160 days.

(21) Appl. No.: 13/622,039

(22) Filed: Sep. 18, 2012

(65) Prior Publication Data

US 2013/0073806 A1 Mar. 21, 2013

(30) Foreign Application Priority Data

Sep. 20, 2011 (IN) .......................... 3254/CHE/2011

(51) Int. Cl.
*G06F 12/00* (2006.01)
*G06F 11/34* (2006.01)

(52) U.S. Cl.
CPC ........ *G06F 11/3442* (2013.01); *G06F 11/3409* (2013.01); *G06F 11/3485* (2013.01)

(58) Field of Classification Search
USPC ........................................................ 711/114
See application file for complete search history.

(56) References Cited

U.S. PATENT DOCUMENTS

| 5,537,567 | A | * | 7/1996 | Galbraith et al. | ............. | 711/114 |
| 2003/0069780 | A1 | * | 4/2003 | Hailwood et al. | ............... | 705/10 |
| 2005/0097290 | A1 | * | 5/2005 | Cochran et al. | ............... | 711/165 |
| 2007/0220208 | A1 | * | 9/2007 | Nomura et al. | ............... | 711/137 |
| 2009/0144393 | A1 | * | 6/2009 | Kudo | ............................ | 709/218 |
| 2010/0122020 | A1 | * | 5/2010 | Sikdar et al. | .................. | 711/103 |
| 2010/0250501 | A1 | * | 9/2010 | Mandagere et al. | .......... | 707/692 |

* cited by examiner

*Primary Examiner* — Larry Mackall
(74) *Attorney, Agent, or Firm* — Schwegman Lundberg & Woessner, P.A.

(57) ABSTRACT

Techniques for translating Service Level Agreement (SLA) policy into storage controller requirements within a cloud storage environment are presented. System resource metrics for a storage controller are derived. The SLA policy is defined in terms of SLA parameters. Heuristics are used to translate the SLA parameters into defined percentages of system resources for the storage controller, which are compared to the system resource metrics and adjustments are updates are made as needed.

20 Claims, 5 Drawing Sheets

TECHNIQUES FOR TRANSLATING POLICIES INTO STORAGE CONTROLLER REQUIREMENTS

RELATED APPLICATIONS

The present application is co-pending with and claims foreign priority to Indian Provisional Patent Application No. 3254/CHE/2011 entitled: "Method and Architecture to Measure System Resource Requirements in a Multi-Tenant Storage Environment," filed with the Indian Patent Office on Sep. 20, 2011, the disclosure of which is incorporated by reference herein in its entirety.

BACKGROUND

Cloud computing is rapidly changing the Internet into a collection of clouds, which provide a variety of computing resources, storage resources, and, in the future, a variety of resources that are currently unimagined.

Specifically, cloud computing is a technology infrastructure that facilitates: supplementing, consuming, and delivering Information Technology (IT) services. The cloud environment provides elastic provisioning of dynamically scalable virtual services.

A tenant is considered as a subscriber of some amount of storage in the cloud or an application who owns part of the shared storage environment. Multi-tenancy is an architecture where a single instance of software runs on a server, which is serving multiple tenants. In a multi-tenant environment, all tenants and their users consume the service from a same technology platform, sharing all components in the technology stack including the data model, servers, and database layers. Further, in a multi-tenant architecture, the data and configuration is virtually partitioned and each tenant works with a customized virtual application instance.

A multi-tenant storage controller hosts multiple storage tenants. Each tenant need to be guaranteed with set of performance parameters in terms of IOPS, latency and throughput. To provide such a granular level of SLA in the multi-tenant storage systems, all the system resources need to be tightly controlled. However, calculating the system resource requirement for a given set of performance parameter is a complex process since it depends on many variables in the system.

In fact except for a very few, most commercial storage controllers are not multi-tenanted. Almost all of the storage controllers try to achieve whole system level performance parameters by over-provisioning. Even with over-provisioning, the chance of lower performance from the storage is much higher with current technologies. The storage controllers that claim to be multi-tenant try to provide the differential services among the tenants by assigning different priorities to them. This lacks in the following aspects:

1) granular policy control, which is critical in the cloud environment and is not possible with existing approaches;
2) they are based on best effort priority adjustment, hence performance parameters are not guaranteed;
3) when the overall system is highly loaded, individual tenants end up with much lower performance due to locks occurring around resource contentions; and
4) they cannot control the spike in resource utilization—these spikes can really make the controller unusable for an extended period of time.

Traditionally, storage controllers, on which two tenants are provisioned, the resources (Central Processing Unit (CPU), Memory, File System Buffers, Disk driver buffers, Network resources) are all shared. The Service Level Agreement (SLA) controlling parameters such as, Input/Output Operations Per Second (IOPS), throughput, and latency per tenant depends directly on the availability of the resources.

Unless the resources are made available, the SLA per tenant cannot be guaranteed. The amount of resources needed to achieve a particular SLA depends on the type of application that is using the storage and also the amount of resources available on the storage controller. The biggest challenge is to identify the right amount of controller resources in order to realize the required SLA performance.

SUMMARY

Various embodiments of the invention provide techniques for translating Service Level Agreement (SLA) policy until storage controller requirements within a cloud storage environment. Specifically, and in one embodiment a method for configuring storage controller requirements in a cloud storage environment is presented.

More particularly and in an embodiment, a Service Level Agreement (SLA) policy is defined for a tenant in a multi-tenant storage cloud environment in terms of performance parameters. Then, controlling factors are acquired, which affect resource performance for a storage controller assigned to the tenant. Finally, the controlling factors are evaluated against heuristics to arrive at resources and resource configurations of the storage controller that meet or exceed the performance parameters.

DETAILED DESCRIPTION

A "resource" includes a user, service, system, device, directory, data store, groups of users, a file, a file system, combinations and/or collections of these things, etc. A "principal" is a specific type of resource, such as an automated service or user that acquires an identity. As used herein a "principal" may be used synonymously and interchangeably with the term "tenant."

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," "cloud environment," and the term "cloud" may be used interchangeably and synonymously herein.

Moreover, it is noted that a "cloud" refers to a logical and/or physical processing environment as discussed above.

The techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

It is within this context that embodiments of the invention are now discussed within the context of the FIGS. 1-4.

Figure 1A:
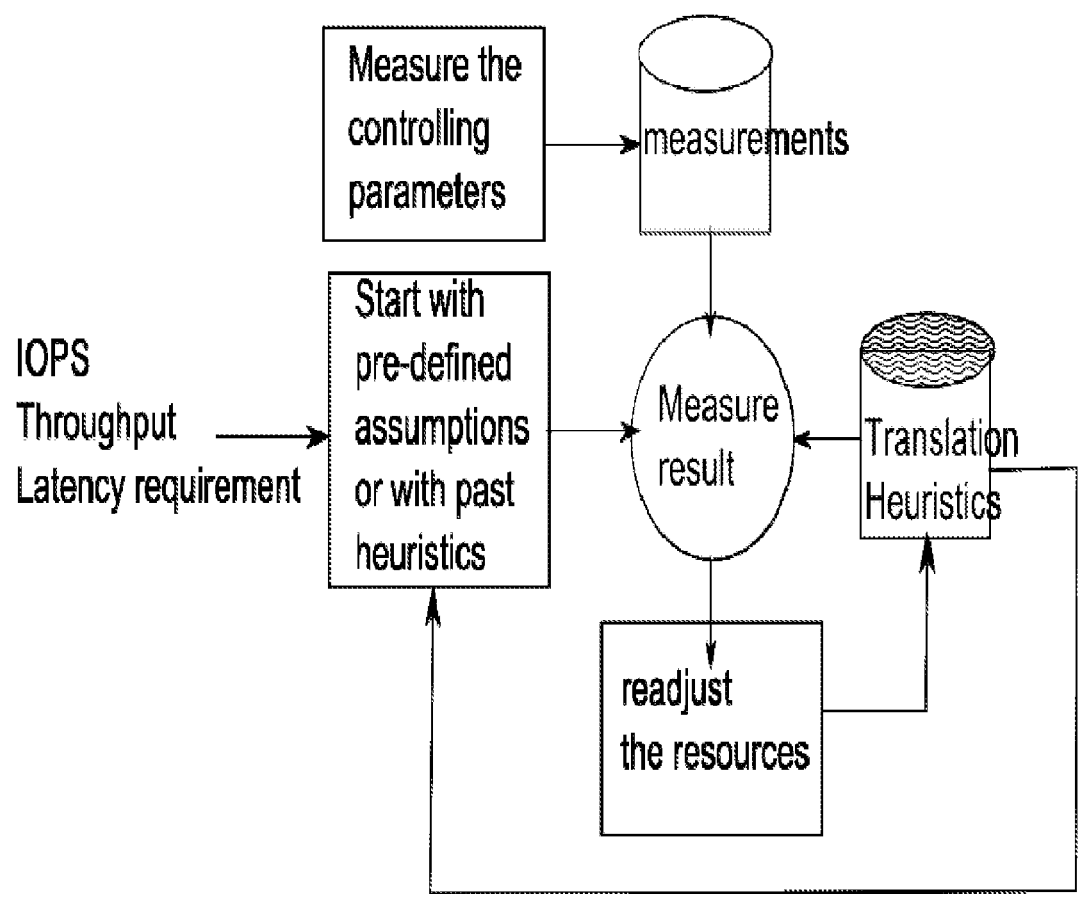
FIG. 1A is a diagram depicting a technique for identifying storage controller parameters used for translating Service Level Agreement (SLA) policy into required resources on a storage controller within a cloud storage environment, according to embodiments presented herein.

FIG. 1A is a diagram depicting a technique for identifying storage controller parameters used for translating Service Level Agreement (SLA) policy into required resources on a storage controller within a cloud storage environment, according to embodiments presented herein. It is noted that the architecture is presented as one example embodiment as other arrangements and elements are possible without departing from the teachings presented herein.

The techniques herein prescribe unique mechanisms for identifying the variables in a multi-tenant storage system and establishing the inter-relationship between those variables to achieve a translation in storage level requirements from an initial SLA policy. As will be demonstrated, the techniques herein prescribe an algorithm for translating the required IOPS into various system resources. The techniques herein prescribe unique techniques in which a particular SLA policy is translated into the amount of these resources (required storage controller resources).

This embodiments herein address the following issues:
A avoids the requirement of over provisioning storage to meet performance parameters, which in turn saves huge expense;
paves the way for granular control of performance parameters for each tenant in the multi-tenanted storage environment; and
devises a technique to guarantee the performance parameters for each tenant irrespective of the overall system load.

The techniques herein provide the way to calculate the exact resource requirements in terms of CPU, memory/cache, disk Input/Output (IO), and network for a given set of performance parameters; this can be done for any kind of workload.

Many embodiments herein seek to intelligently derive the required number of system resources, such as CPU cycles, amount of cache and disk location in order to achieve an expected SLA policy in terms of IOPS, throughput, and latency of a given storage tenant.

As shown in the FIG. 1A, various storage controller parameters play a key role in translating the SLA policy into required resources for the storage controller of a cloud storage environment.

System resource requirements, in the storage controller, depend on multiple factors and vary widely for different kinds of datasets and different kinds of storage operations.

Major controlling factors are:
read vs write data access;
random vs sequential data access;
Redundant Array of Independent Disks (RAID) configuration;
level of disk fragmentation:
  in case of read, % of times single IO from the tenant needs to collect data from multiple disk locations and aggregate; and
  in case of write, % of times single tenant 10 is not finding continuous portion of the disk;
nature of the disk and its Rotations Per Minute (RPM) if applicable;
number of parallel disks in the given storage pool;
average IO size
resource intensive features like compression, de-duplication, and encryption;
data change rate—impacts the amount of housekeeping done by the storage in the background;
data size;
backend operations, such as snapshot schedules and backup schedules;
sync vs async type Loss of Service (LOS);
file system cache utilization; and
disk utilization (how busy are the disk drives).

Process of arriving at meaningful translation:
1. continuously measure all of the above controlling factors for a given tenant;
2. update the measurements in a database;
3. if no heuristic data is available for a given storage tenant, the translation process starts with pre-defined assumptions for a given SLA policy—if the heuristic data is available, the translation process starts with that data;
4. the translated resources (CPU/cache/disk location) are applied—the resulting SLAB are measured periodically, every 5 minutes;
5. the result is compared with desired values and the resources are readjusted;
6. as soon as the improvement happens, the corresponding heuristic entry for the given tenant against the given SLA policy is updated; and
7. this process continues to run all the time, as the measurements of controlling parameters can change from time to time.

Example Calculation

For example a tenant is configured with following performance parameters:
125 IOPS;
latency<10 milliseconds (ms); and
throughput>10 Mega Bytes per second (MBps).

Step 1: measure the controlling factors, which results in the following:
50% IO's are READ—read_%;
80% IO access is random—rand_%;
10% disk fragmentation—frag_%;
15K RPM SAS disks in the storage pool—disk_speed;
24 parallel disks in the pool—disk_no;
average IO size is 4k—IO_size;
single parity RAID—raid_weight;
de-duplication ratio 1.2, —dedup_ratio;
compression ratio 1.5—comp_ratio;
Encryption type Advanced Encryption Standard (AES)—encrypt_type;
data change rate 10 MBps—data_rate;
snapshot scheduled for every 10 minutes—snap_freq; and
backup scheduled for every 1 hour—bkp_freq.

Step 2: arrive at equation for performance parameters—
IOPS, latency and throughput:
  CPU utilization=f(read_%,rand_%, . . . Data_rate, bkp_freq);
  Disk IO=f(read_%,rand_%, . . . Data_rate, bkp_freq);
  Network=f(IO_size, bkp_freq); and
  Cache=f(read_%,rand_%, . . . Data_rate, bkp_freq).
Step 3: correlate with the past heuristic data if any:
retrieve the following information from the past:
  age of the heuristic data—more the age, higher the weightage since it could have got tuned over a period of the time;
  for each of the performance parameters like IOPS, latency and throughput, system resource requirements;
Calculate the final resource requirements:
  Final_cpu=(1−ageweight)*cpu+ageweight*cpu_history;
  Final_Disk IO=(1−ageweight)*disk_io+ageweight*disk_io;
  Final_network=(1−ageweight)*network+ageweight*network; and
  Final_cache=(1−ageweight)*cache+ageweight*cache;
Step 4: calculate the resource for defined policy:
  step 3 gives the per 10 resource requirement, to arrive at a resource requirement for a given policy, multiply with a configured number,
  Policy_cpu=final_cpu*125;
  Policy_disk_io=final_cpu*125;
  Policy_network=final_cpu*125; and
  Policy_cache=final_cpu*125.

Figure 1B:
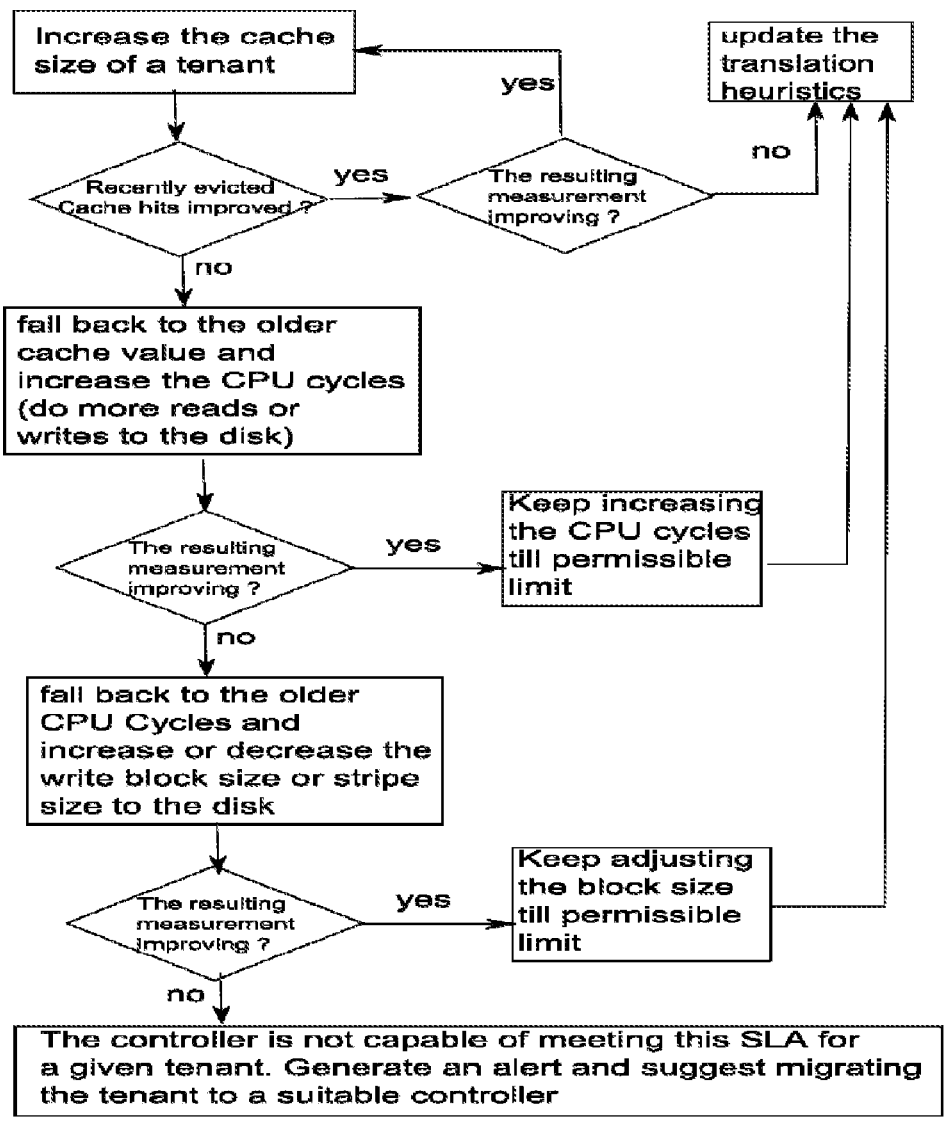
FIG. 1B is a diagram of an algorithm for readjusting storage controller requirements based on a SLA policy, according to embodiments presented herein.

FIG. 1B is a diagram of an algorithm for readjusting storage controller requirements based on a SLA policy, according to embodiments presented herein. Again, the diagram is presented for purposes of illustration and other arrangements are foreseeable without detracting from the teachings presented herein.

As shown in the FIG. 1B, first the cache size of a storage tenant is manipulated and the result is observed. If the cache size is improving, the tenant work load is considered to be cache sensitive. If the work load is not cache sensitive or if enough cache is not available on the system, then an attempt is made to adjust the CPU cycles. Giving more CPU cycles means writing or reading more data to or from the disks. If the results are improving, this is continued until a permissible limit. If there is no improvement, an attempt is made to change the block size or stripe size across the disks. If this is also not helping, then it is assumed that the controller resources are exhausted for a given SLA policy for a given tenant, and an alert is generated and a notification is generated suggesting the migration of tenant to a new suitable storage controller.

The techniques presented herein provide a variety of novel benefits, such as:

1. defining SLA policies in terms of SLA parameters and hiding the actual system parameters from the administrator;
2. providing a list of controllable parameters to be considered for heuristic storage system resource calculations;
3. measuring identified parameters that impact resource consumption of a storage controller per 10 transactions;
4. using heuristics to arrive at the translation of a SLA policy into required system resources the algorithm of readjusting cache, CPU cycles, disk block size to improve the proximity to the desired SLA policy of a given tenant; and
5. correlating heuristically derived data.

Figure 2:
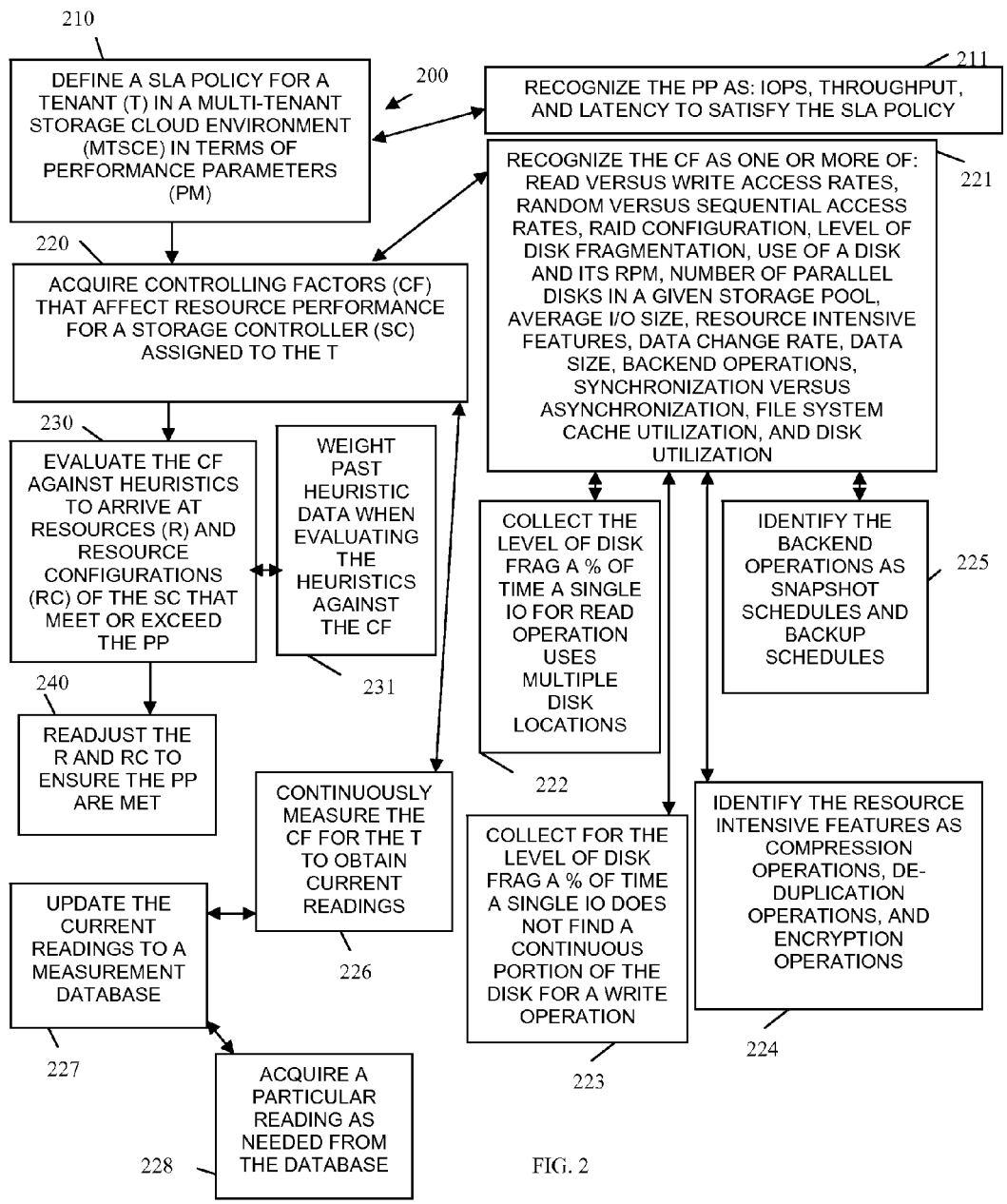
FIG. 2 is a diagram of a method for configuring storage controller requirements in a cloud storage environment, according to embodiments presented herein.

FIG. 2 is a diagram of a method 200 for configuring storage controller requirements in a cloud storage environment, according to embodiments presented herein. The method 200 (herein referred to as "SLA policy translator") is implemented, programmed, and resides within a non-transitory machine-readable storage medium that executes on one or more processors of a network. The network may be wired, wireless, or a combination of wired and wireless.

In an embodiment, the SLA policy translator utilizes the techniques presented above with respect to the FIGS. 1A-1B.

At 210, the SLA policy translator defines a SLA policy for a tenant in a multi-tenant storage cloud environment (a cloud storage environment servicing multiple tenants) in terms of performance parameters. So, the SLA policy is converted or mapped to performance parameters. Some of which were discussed above with reference to the FIGS. 1A and 1B.

According to an embodiment, at 211, the SLA policy translator recognizes the performance parameters as: IOPS, processing throughput, and/or latency rate that satisfy the SLA policy.

At 220, the SLA policy translator acquires controlling factors that affect resource performance for a storage controller assigned to the tenant. It is noted that there can be multiple storage controllers logically assembled in the multi-tenant storage cloud environment for the tenant as a Tenant Storage Machine (TSM).

In an embodiment, at 221, the SLA policy translator recognizes the controlling factors as one or more: read versus write data access rates, random versus sequential data access rates, RAID configuration, level of disk fragmentation, use of disk and its rotations per minute, number of parallel disks in a given storage pool, average IO size, resource intensive features, data change rate, data size, backend operations, synchronization versus asynchronization, file system cache utilization, and/or disk utilization.

Continuing with the embodiment of 221 and at 222, the SLA policy translator collects for the level of disk fragmentation a percentage of time a single IO for the tenant collects data on a read operation from multiple disk locations and performs aggregation.

Still continuing with the embodiment of 221 and at 223, the SLA policy translator collects for the level of disk fragmentation a percentage of time a single IO for the tenant is not finding a continuous portion of the disk for a write operation.

Still continuing with the embodiment of 221 and at 224, the SLA policy translator identifies the resource intensive features as compression operations, de-duplication operations, and encryption operations.

Continuing with the embodiment of 221 and at 225, the SLA policy translator identifies the backend operations as snapshot schedules and backup schedules.

In an embodiment, at 226, the SLA policy translator continuously measures the controlling factures for the tenant to obtain current readings.

Continuing with the embodiment of 226 and at 227, the SLA policy translator updates the current readings to a measurement database.

Continuing with the embodiment of 227 and at 228, the SLA policy translator dynamically acquires a particular reading from the measurement database as needed for evaluation.

At 230, the SLA policy translator evaluates the controlling factors against heuristics to arrive at resources and resource configurations of the storage controller that meet or exceed the performance parameters.

According to an embodiment, at 231, the SLA policy translator weights past heuristic data when evaluating the heuristics against the controlling factors.

In an embodiment, at 240, the SLA policy translator readjusts the resources and the resource configurations to ensure the performance parameters are met.

Figure 3:
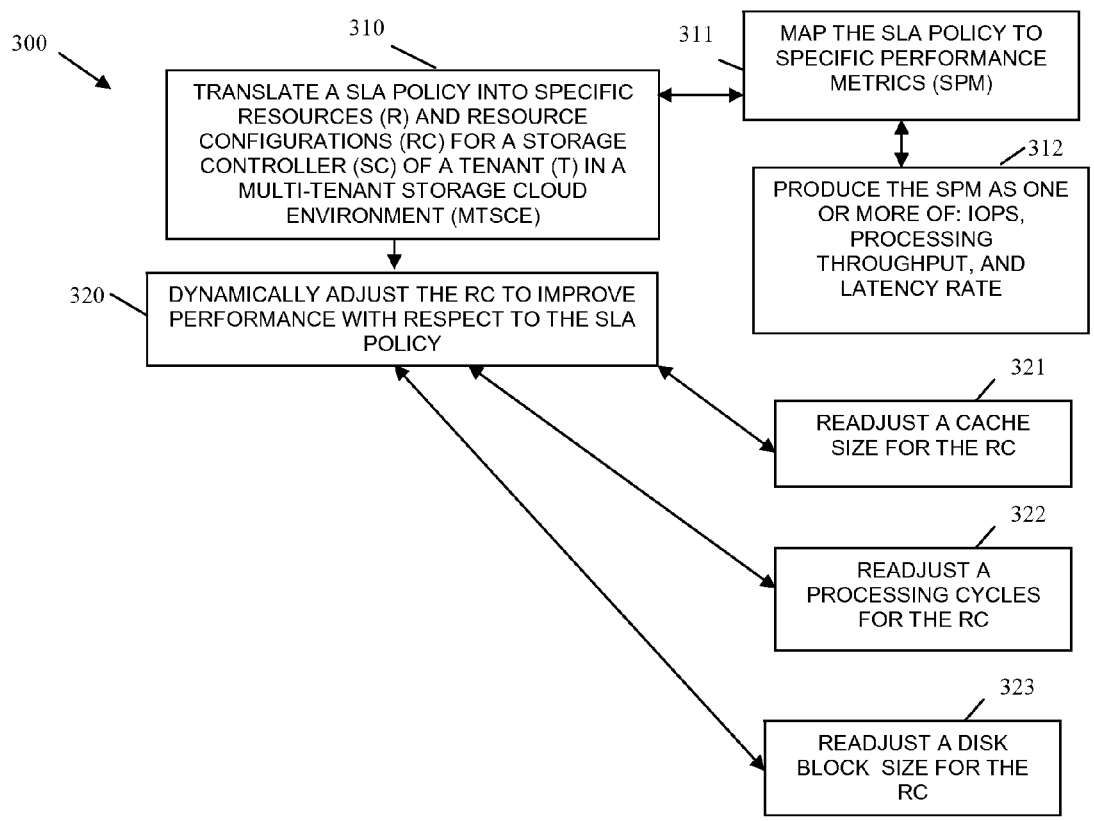
FIG. 3 is a diagram of another method for configuring storage controller requirements in a cloud storage environment, according to embodiments presented herein.

FIG. 3 is a diagram of another method 300 for configuring storage controller requirements in a cloud storage environment, according to embodiments presented herein. The method 300 (herein referred to as "controller configure manager") is implemented, programmed, and resides within a non-transitory machine-readable storage medium that executes on one or more processors of a network. The network may be wired, wireless, or a combination of wired and wireless.

The controller configure manager presents another and in some cases enhanced perspective of the SLA policy translator represented by the method 200 of the FIG. 2. Moreover, the controller configure manager is implemented or deployed utilizing the techniques of the FIGS. 1A-1B.

At 310, the controller configure manager translate a SLA policy into specific resources and resource configurations for a storage controller.

According to an embodiment, at 311, the controller configure manager maps the SLA policy into specific performance metrics.

Continuing with the embodiment of 311 and at 312, the controller configure manager produces the specific performance metrics as one or more of: IOPS, processing throughput, and a latency rate.

At 320, the controller configure manager dynamically adjusts the resource configurations to improve performance with respect to the SLA policy.

In an embodiment, at 321, the controller configure manager readjusts a cache size for the resource configurations.

In another case, at 322, the controller configure manager readjusts processing cycles for the resource configurations.

In yet another situation, at 333, the controller configure manager readjusts a disk block size for the resource configurations.

Figure 4:
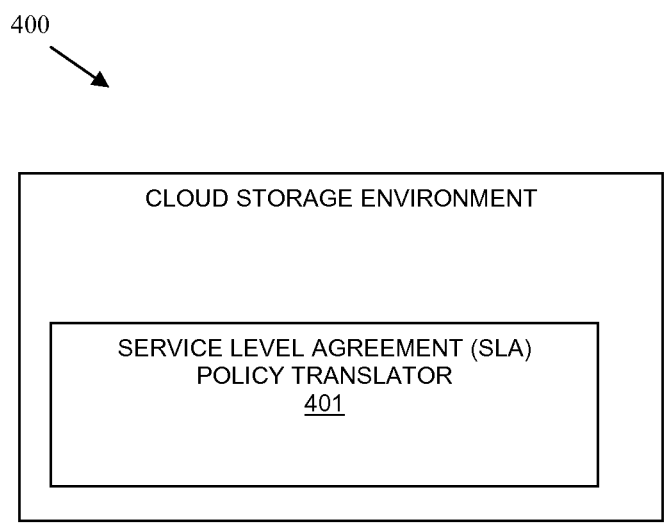
FIG. 4 is a diagram of a storage controller configuration system, according to embodiments presented herein.

FIG. 4 is a diagram of a storage controller configuration system 400, according to embodiments presented herein. The components of the storage controller configuration system 400 are implemented, programmed, and reside within a non-transitory machine-readable storage medium that executes on one or more processors of a network. The network may be wired, wireless, or a combination of wired and wireless.

In an embodiment, the storage controller configuration system 400 implements, inter alia, the processing associated with the methods 200 and 300 of the FIGS. 2 and 3, respectively using the techniques provided by the FIGS. 1A-1B.

The storage controller configuration system 400 includes a cloud storage environment having a SLA policy translator 401.

The storage controller configuration system 400 includes the cloud storage environment that has one or more processors, memory, and storage.

The memory of the cloud storage environment is configured with the SLA policy translator 401, which is implemented as executable instructions that process on one or more processors of the cloud storage environment. Example processing associated with the SLA policy translator 401 was presented above in detail with reference to the FIGS. 1A, 1B, 2, and 3.

The SLA policy translator 401 is configured to define a SLA policy in terms of performance metrics and then acquire control factors that affect performance of a storage controller for a tenant of the cloud storage environment.

The SLA policy translator 401 is also configured to configure resources of the storage controller in view of the control factors to achieve the performance metrics of the SLA policy.

According to an embodiment, the SLA policy translator 401 is further configured to dynamically reconfigure and readjust the resources and regularly monitors current performance of the storage controller for the tenant in view of the performance metrics.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors of a machine configured to perform the method, comprising:
    defining, on the machine, a Service Level Agreement (SLA) policy for a tenant in a multi-tenant storage cloud environment in terms of performance parameters;
    acquiring, from the machine, controlling factors that affect resource performance for a storage controller assigned to the tenant, wherein the storage controller logically assembled in the multi-tenant storage cloud environment for the tenant as a tenant storage machine specific to the tenant, and the multi-tenant storage cloud environment servicing multiple other tenants, wherein acquiring further includes deriving an equation for the performance parameters based on the controlling factors and correlating past heuristic data for the storage controller with the performance parameters; and
    evaluating, from the machine, the equation for the performance parameters using measurements collected for the storage controller and using the past heuristic data for calculating resource requirements and selecting resources and resource configurations of the storage controller that meet or exceed the performance parameters based on the calculated resource requirements.

2. The method of claim 1, wherein defining further includes recognizing the performance parameters as: Input/Output Operations Per Second, processing throughput, and latency rate that satisfy the SLA policy.

3. The method of claim 1, wherein acquiring further includes recognizing the controlling factors as one or more of: read versus write data access rates, random versus sequential data access rates, Redundant Array of Independent Disks (RAID) configuration, level of disk fragmentation, use of a disk and its rotations per minute, number of parallel disks in a given storage pool, average Input/Output (IO) size, resource intensive features, data change rate, data size, backend operations, synchronization versus asynchronization, file system cache utilization, and disk utilization.

4. The method of claim 3, wherein recognizing further includes collecting for the level of disk fragmentation a percentage of time a single IO for the tenant collects data on a read operation from multiple disk locations and performs aggregation.

5. The method of claim 3, wherein recognizing further includes collecting for the level of disk fragmentation a percentage of time a single IO for the tenant is not finding a continuous portion of the disk for a write operation.

6. The method of claim 3, wherein recognizing further includes identifying the resource intensive features as compression operations, de-duplication operations, and encryption operations.

7. The method of claim 3, wherein recognizing further includes identifying the backend operations as snapshot schedules and backup schedules.

8. The method of claim 1, wherein acquiring further includes continuously measuring the controlling factors for the tenant to obtain current readings.

9. The method of claim 8, wherein continuously measuring further includes updating the current readings to a measurement database.

10. The method of claim 9, wherein continuously measuring further includes acquiring a particular reading when needed from the measurement database.

11. The method of claim 1, wherein evaluating further includes weighting the past heuristic data against the controlling factors.

12. The method of claim 1 further comprising, readjusting, by the machine, the resources and the resource configurations to ensure the performance parameters are met.

13. A method implemented in a non-transitory machine-readable storage medium and processed by one or more processors of a machine configured to perform the method, comprising:

translating, on the machine, a Service Level Agreement (SLA) policy into specific resources and resource configurations for a storage controller of a tenant in a multi-tenant storage cloud environment, wherein the storage controller is logically assembled in the multi-tenant storage cloud environment for the tenant as a tenant storage machine specific to the tenant and the multi-tenant storage cloud environment service multiple other tenants, and wherein translating further includes deriving an equation for performance parameters based on the controlling factors for the storage controller, correlating past heuristic data for the storage controller with the performance parameters, and evaluating the equation for the performance parameters using measurements collected for the storage controller and using the past heuristic data for calculating resource requirements and selecting the specific resources and resource configurations for the storage controller that meet or exceed the performance parameters based on the calculated resource requirements; and dynamically adjusting, on the machine, the resource configurations to improve performance with respect to the SLA policy.

14. The method of claim 13, wherein translating further includes mapping the SLA policy to specific performance metrics.

15. The method of claim 14, wherein mapping further includes producing the specific performance metrics as one or more of: Input/Output Operations Per Second, processing throughput, and a latency rate.

16. The method of claim 13, wherein dynamically adjusting further includes readjusting a cache size for the resource configurations.

17. The method of claim 13, wherein dynamically adjusting further includes readjusting processing cycles for the resource configurations.

18. The method of claim 13, wherein dynamically adjusting further includes readjusting a disk block size for the resource configurations.

19. A system, comprising:

a cloud storage environment having one or more processors, memory, and storage, the cloud storage environment situated in a cloud environment and accessed over a network; and the memory configured with a Service Level Agreement (SLA) policy translator implemented as executable instructions that process on the one or more processors of the cloud storage environment;

wherein the SLA policy translator is configured to define a SLA policy in terms of performance metrics and then acquire control factors that affect performance of a storage controller for a tenant of the cloud storage environment, and wherein the SLA policy translator is further configured to derive an equation for the performance metrics based on the control factors, correlate past heuristic data for the storage controller with the performance metrics, evaluate the equation for the performance metrics using measurements collected for the storage controller and using the past heuristic data for calculating resource requirements, and select specific resources and resource configurations for the storage controller that meet or exceed the performance metrics based on the calculated resource requirements, and the SLA policy translator configured to configure the specific resources with the resource configurations, and wherein the storage controller logically assembled in the cloud storage environment for the tenant as a tenant storage machine specific to the tenant and the cloud storage environment servicing multiple other tenants.

20. The system of claim 19, wherein the SLA policy translator is further configured to dynamically reconfigure and readjust the specific resources and regularly monitors current performance of the storage controller for the tenant in view of the performance metrics.

* * * * *

UNITED STATES PATENT AND TRADEMARK OFFICE
CERTIFICATE OF CORRECTION

PATENT NO. : 9,218,264 B2  
APPLICATION NO. : 13/622039  
DATED : December 22, 2015  
INVENTOR(S) : Xavier et al.

Page 1 of 1

It is certified that error appears in the above-identified patent and that said Letters Patent is hereby corrected as shown below:

On the title page

Item (72), in "Inventors", in column 1, line 1, after "Bangalore", insert --, Karnataka--, therefor Item (72), in "Inventors", in column 1, line 2, after "Bangalore", insert --, Karnataka--, therefor Item (72), in "Inventors", in column 1, line 3, after "Bangalore", insert --, Karnataka--, therefor Signed and Sealed this
Twenty-eighth Day of June, 2016

Michelle K. Lee
*Director of the United States Patent and Trademark Office*